Sept. 2, 1930.  O. PFOUTZ  1,774,994
HIGH PRESSURE VALVE DEVICE
Filed Aug. 8, 1928
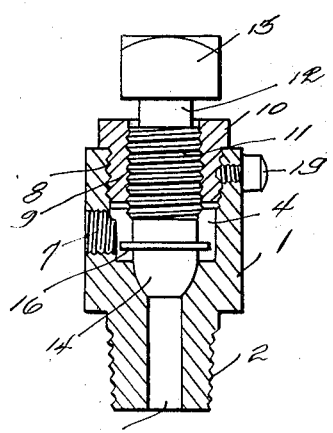
– FIG -1–
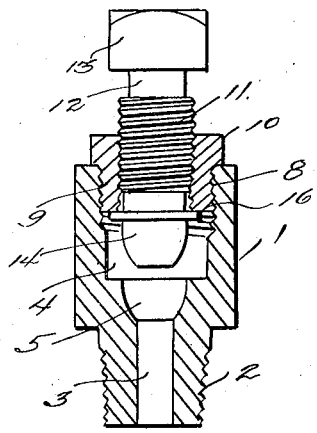
– FIG -2–
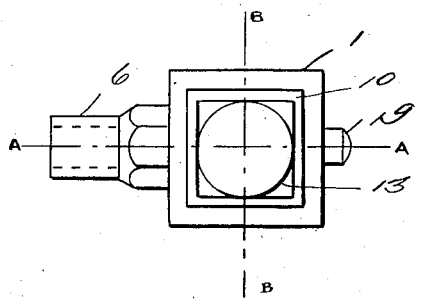
– FIG -3–
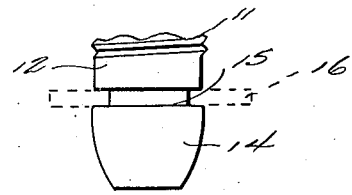
– FIG -5–
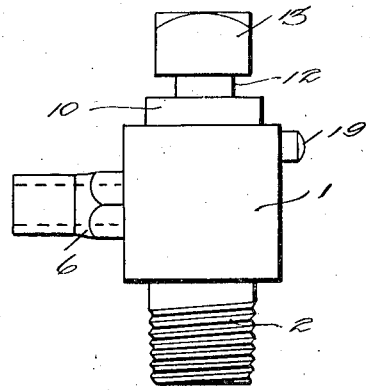
– FIG -4–
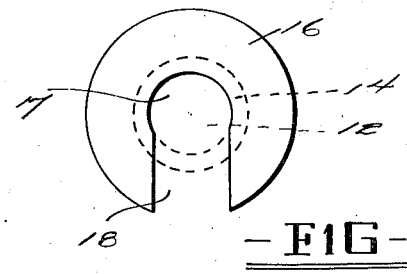
– FIG -6–
Inventor
OLEN PFOUTZ,
By
Attorney Patented Sept. 2, 1930

1,774,994

UNITED STATES PATENT OFFICE

OLEN PFOUTZ, OF GREENSBURG, PENNSYLVANIA

HIGH-PRESSURE-VALVE DEVICE

Application filed August 8, 1928. Serial No. 298,325.

It has been found that valves and valve stems used in tapping, venting, charging and discharging tanks, high pressure lubricating lines, high pressure storage chambers, and the like, are inclined or have a tendency to become unadjusted or to completely back out the valve and valve stem under the influence of high pressure. Especially is this true of lubricating valves of steam engines, locomotives, and the like. My present invention relates, in its broad aspect, to a type of valve wherein the valve and stem are positively locked against being backed out of the valve casing, and wherein but few parts are used, all parts being accessible for cleaning, replacement and adjustment, and wherein no complicated mechanisms are employed in the structure of the valve necessitating the use of special precision machines in its manufacture. Furthermore, conventional valves now in use can be readily changed over or modified in accordance with the practice defined by my invention, and this done at small cost, without modifying radically conventional valves now in use, and without employment of special tools and machines. More particularly it is my purpose to provide a valve of the above general type, wherein the stem of the valve is formed with an annular groove to receive therein a stop washer of what is known as the U-type, and which has sufficient inherent resiliency or spring action to grip the valve stem to hold the stop washer in place. The stop washer in combination with my present type of valve and stem forms a simple, durable and positive means for preventing backing out of the valve and stem, and this form of stop may be readily replaced, adjusted, mended if broken, and applied to existing valves without wholly disarranging the operation of the engine or necessitating lay-up or shop work on a locomotive on which said valve is desired to be used. In addition to the above my valve seat may be reground under any conditions and circumstances by using any one of a number of valve grinding compounds; it consists of but five parts and these are simple in construction and can be expeditiously assembled and manufactured at small cost; the valve and stem are one piece construction, and no packing is required since the valve is tight at all times, thereby eliminating leaky packing and the like. My valve furthermore provides a safe means of draining the lubricating valves of steam engines by preventing the stem on the lubricator drain valve from being screwed clear out or being forced out by steam pressure. In fact the old type of drain valve now employed may be easily and quickly drilled and tapped to receive the fillister headed screw or valve stem, lock washer and valve head. In other words, among other features and advantages, I have reduced the locking or stop feature of my valve to its simplest practical terms. My valve also has the advantage of being formed of parts readily purchasable upon the open market, or adapted from conventional machine parts by the simplest form of machine and shop work.

Other objects and advantages will be apparent as the detailed description of the parts of my valve proceeds, but attention is invited to the fact that the scope of my invention is to be determined by reference to the claims appended hereunto.

In the drawings wherein is illustrated the preferred form of my invention:—

Figure 1 is a vertical section taken on the line A—A of Figure 3;

Figure 2 is a vertical section taken on the line B—B of Figure 3;

Figure 3 is a top plan view;

Figure 4 is a side elevation of the assembly;

Figure 5 is a detail of the valve head and stop washer groove, and

Figure 6 is a detail view of my stop washer.

In the drawings wherein like characters of reference are used to designate like or similar parts throughout the several views.

The high pressure valve casing is designated by the numeral (1) and this is preferably rectangular in configuration although I do not wish to be limited to that shape since it may be cylindrical, oblong or otherwise. The casing has a threaded nipple or boss (2) having a channel (3) and adapted to be tapped into the object or engine to which the valve is applied. The channel (3) communicates with the chamber (4) within the casing (1), and a cupped valve seat (5) is formed at the inner end of the channel. Leading laterally from the chamber (4) is the outlet or tap (6), or what may be termed the drain fitting, which is screwed into an interiorly threaded opening (7) shown in Figure 1. The wall of the casing (1) opposite the channel (3) is drilled out and threaded as at (8) to receive a threaded bushing (9) the top of which is flanged as at (10) to form a wrench grip. The bushing is hollow and screwthreaded to receive the elongated threaded portion (11) of my valve stem (12), the outer end of which has a fillister head (13), this being a common type of machine screw head such as is described and illustrated on page 289, American Machinists Handbook, (Colvin and Stanley), second edition, published by McGraw-Hill Book Company, New York, and the inner end of which is a frustro-ellipsoidal valve head (14) fitting into the cupped valve seat (5). It will be noted that the parts 11, 12, 13 and 14 are integral, and may be formed by turning down a fillister screw and of such cross-sectional diameter that they can be screwed or backed out of the bushing (9).

In order to prevent backing out of the aforementioned parts including the valve head and stem, the stem is formed with an annular groove (15) above the base of the frustro-ellipsoidal valve head, in which is seated a U-shaped stop washer (16), shown in detail in Figure 6. The washer has a center opening (17) of greater diameter than the width of the open portion (18) thereof so that the arms of the washer must spring somewhat to fix it about the valve stem and when so fixed in place it will remain there due to its inherent resiliency or springiness until positively removed. Thus the valve is prevented from backing out by reason of contact of the washer (16) with the inner end of the bushing (9) as shown in Figure 2; Figure 2 being the open position of the valve, and Figure 1 the closed position of the valve.

In order to prevent backing out of the bushing (9) or accidental displacement or maladjustment of the bushing I provide a locking screw stud (19) which extends through the wall of the casing into engagement with the bushing as shown in Figure 1.

It will therefore be seen that my device consists of but five separate parts; the casing, the bushing, the integral valve stem, head and fillister nut, the drain fitting, and the stop washer. It will furthermore be noted that the entire structure may be readily taken down for repairs and cleaning; that there is nothing to get out of order, and that the valve seat may be reground with facility by simply using any one of a variety of grinding compounds.

In use the device is applied where desired and when it is desired to drain or open the valve it is simply screwed out by applying a wrench to the fillister head (13) thereby allowing egress through the channel (3) chamber (4) and tap (6); it is impossible to wholly remove the valve without first removing the bushing, and the valve cannot be accidentally backed out by steam pressure or the like by reason of the stop washer (16).

While in the foregoing there has been illustrated and described in the drawings and specification such combination and arrangement of elements as constitute the preferred embodiments of my valve device, it is nevertheless desired to again emphasize the fact that interpretation of the scope of the invention should only be conclusive when made in the light of the subjoined claims.

I claim:—

1. A valve device comprising a casing having an inlet port and an outlet port and a valve seat therein, a valve in the casing, the stem of the valve being grooved above the valve, and a spring metal washer within the groove gripping the stem of the valve and adapted to prevent accidental displacement or backing out of the stem and valve from the casing.

2. A valve device comprising a casing having an inlet port and an outlet port and a cup-shaped valve seat therein, a frustro-ellipsoidal valve in the casing, the stem of the valve being grooved above the valve, a U-shaped washer frictionally gripping the stem and disposed in the groove and adapted to prevent accidental displacement of the stem and valve or the backing out of the same, and a bushing carried by the casing and supporting the valve stem.

3. A stop device for valves to prevent backing out of a valve from its casing, comprising a resilient U-shaped washer frictionally engaging the stem, the width of the cut-away portion of the washer being less than the diameter of the stem to prevent displacement thereof, said washer engaging the casing to prevent withdrawal of the valve and stem.

4. A valve device comprising a hollow casing having an inlet in the bottom thereof and an outlet in its side, and provided with a cup-shaped valve seat at the inlet, a frustro-ellipsoidal valve in the casing and movable to engage the valve seat, the casing provided with a threaded opening in the top thereof opposite the valve seat, a hollow, threaded bushing in the opening, and a valve stem threaded into the bushing and carrying the head, said valve stem provided with a groove above the valve head, and a U-shaped spring stop washer engageable in the groove of the stem to prevent backing out of the stem and valve head.

5. A valve head and stem comprising a fillister headed screw turned down to provide a smooth portion directly below the head, and another smooth portion directly below the threads, the end of the screw being turned down to form a frustro-ellipsoidal valve head, and grooved above the valve head to receive thereon a stop washer.

In testimony whereof, I affix my signature hereunto.

OLEN PFOUTZ.